United States Patent [19]
Schrock

[11] Patent Number: 5,897,228
[45] Date of Patent: Apr. 27, 1999

[54] CAMERA WITH LOW COST INTERCHANGEABLE PUSHBUTTON ANNOTATION

[75] Inventor: Anthony W. Schrock, Rochester, N.Y.

[73] Assignee: Eastman Kodak Company, Rochester, N.Y.

[21] Appl. No.: 08/808,919

[22] Filed: Feb. 28, 1997

[51] Int. Cl.⁶ .................................................. G03B 17/00
[52] U.S. Cl. ........................................... 396/297; 396/310
[58] Field of Search ..................... 396/211, 297, 396/299, 300, 310

[56] References Cited

U.S. PATENT DOCUMENTS

| | | | |
|---|---|---|---|
| 4,330,186 | 5/1982 | Hattori | 354/106 |
| 4,643,549 | 2/1987 | Nagata et al. | 354/64 |
| 4,705,372 | 11/1987 | Lapeyre | 354/106 |
| 4,728,978 | 3/1988 | Inoue et al. | 396/310 |
| 4,827,347 | 5/1989 | Bell | 358/224 |
| 4,853,733 | 8/1989 | Watanabe et al. | 354/412 |
| 5,023,637 | 6/1991 | Lorton et al. | 354/106 |
| 5,040,016 | 8/1991 | Ishikawa et al. | 354/412 |
| 5,276,470 | 1/1994 | Fridman | 354/106 |
| 5,289,217 | 2/1994 | Rosenblatt | 354/76 |
| 5,300,974 | 4/1994 | Stephenson, III | 354/75 |
| 5,471,267 | 11/1995 | Goto et al. | 354/106 |
| 5,517,266 | 5/1996 | Funaki et al. | 354/106 |

*Primary Examiner*—Russell E. Adams
*Attorney, Agent, or Firm*—James D. Leimbach

[57] ABSTRACT

An annotation system for a camera comprising: a memory card having a plurality of activation switches that are electrically coupled to an encoding circuit, the encoding circuit being operatively coupled to the camera; a look up table is configured to receive data from the encoding circuit as an input and to generate annotation data for the camera as an output; and a mechanism for placing annotation data indicia on film within the camera.

15 Claims, 4 Drawing Sheets

CAMERA WITH LOW COST INTERCHANGEABLE PUSHBUTTON ANNOTATION

FIELD OF THE INVENTION

The invention relates generally to the field of photography and in particular to annotation sytems for cameras.

BACKGROUND OF THE INVENTION

Images are often used to convey information, but often the image alone does not contain all the desired information. Image annotation is the process of adding additional information the image for such uses as enhanced image enjoyment, reminders of the people or places in the image, industry applications, education, classification, and other imaging utilization areas that can benefit from incorporating additional information.

While annotation can be added anytime through a variety of methods, it is often desirable to provide for annotation at the time of picture taking. The desired features of annotation include a wide range of annotation data, ease of use and the function must not interfere with the picture taking process. For a lower cost camera, the addition of the annotation feature must come at a low incremental cost.

Another issue is the amount of storage space available. In the Advanced Photo System (APS) the film is coated with a magnetic layer, allowing data recording on the film. Since there is a limited amount of data space, the specification has designated "select title" codes, so only the code is stored on the film. At the photofinisher, the codes are read and looked up on the predefined table and a title corresponding to the code is printed on the back or front of the image. There are various data entry methods known in the art. U.S. Pat. No. 5,155,513 describes a system using a limited number of annotations to make it easy to select a predefined text string to be added to the negative record. U.S. Pat. No. 4,705,372 discloses one implementation of an alphanumeric keypad to enter data. Some of the current APS cameras that incorporate this feature require the user to program the title codes from a list, much like setting the day/date clock. These entry means either require a display for feedback, to show the user which annotation has been selected, or are fixed in the annotations available. A limited number of titles becomes even more of an issue if new titles are defined. The display in many cameras only shows the title and language code, with no indication of the title data itself. The ones that do have the title data require a fully addressable display (bitmapped), such as a dot matrix LCD.

U.S. Pat. No. 4,827,347 (hereafter referred to as "Bell") teaches a proofing feature for a camera that would recall images. However, it did not supply any means of actually placing annotation data onto the image.

SUMMARY OF INVENTION

It is the object of this invention to provide an annotation input solution that is easy to use, low cost, and has the advantages of simple, unambiguous feedback of the selected annotation, while also allowing customization and expansion capabilities.

This object is fulfilled by an annotation system for a camera comprising: a memory card having a plurality of activation switches that are electrically coupled to an encoding circuit, the encoding circuit being operatively coupled to the camera; a look up table configured to receive data from the encoding circuit as an input and to generate annotation data for the camera as an output; and means for placing annotation data indicia on film within the camera.

The present invention solves the problem of display by using "displayless" feedback, where the user selects an annotation by touching a picture representing the text or other content of an annotation. The user is informed of the annotation that is in use by a low cost light emitting diode (LED). In one implementation, the touchpad area is removeably mounted onto the camera back. Multiple insert cards can be used for different annotations, which allow newly defined titles and other objects to be added to the dataset. In addition, the cards themselves can be made to be programmable, such that a user can select a set of annotations that best fits their needs. U.S. Pat. No. 5,040,016 describes a card for program control of a camera, and U.S. Pat. No. 4,853,733 discloses a program rewritable camera, but neither one implements the user interface, and neither applies to the area of image annotation.

Advantageous Effect of the Invention

This invention provides a low cost means of annotation to the user using a novel means of access to the data, namely, the "display" is a hardcopy representation of the title data, and the camera only has to handle the code representing the title. This simplifies camera design and lowers cost. The removable title cards allow for the system expansion as more titles and other annotation data is defined. The recordable memory and printed conductive material give the user the greatest amount of flexibility in the selection of the desired titles. Other novel features include removable touch pad with program electronics, single button selection, and "programmable" overlays in which all electronics are on the camera and the overlay carries address data encoded within the conductive material printed thereon.

DETAILED DESCRIPTION OF THE INVENTION

Figure 1:
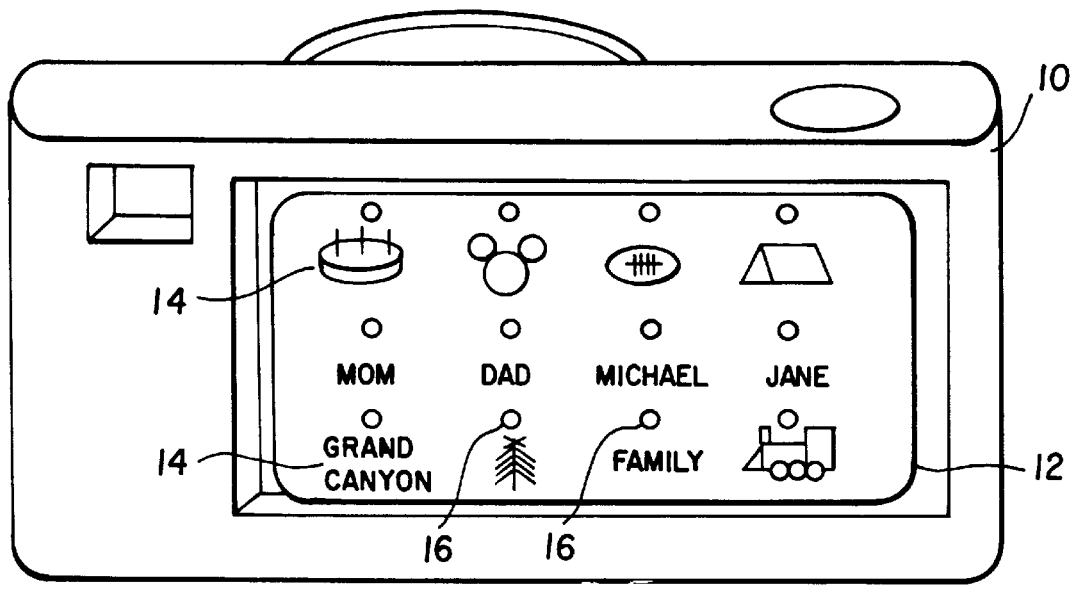
FIG. 1 Illustrates a camera with a matrix of LEDs and membrane switches.

FIG. 1 shows a camera 10 with a removable card 12 containing a plurality of touch contact switches 14 that are used to select annotation data, including a picture overlay representing the annotation data that is selected by that respective switch 14, LEDs 16 indicated when a respective switch 14 has been activated. The card 12 receives power from the camera and communicates data back to the camera via a connector interface (not shown).

Figure 2A:
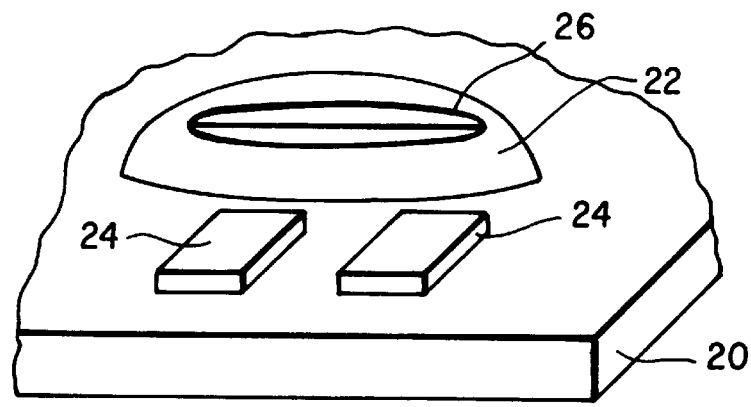
FIG. 2 illustrates a membrane switch as shown on FIG. 1.
Figure 2B:
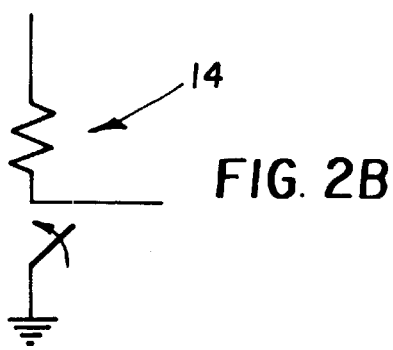

FIG. 2A shows a side view of an embodiment of a touch contact switch 14, while FIG. 2B shows a schematic view of the touch contact switch 14 shown in FIG. 2A. A flexible plastic dome 22 is placed over a set of metallized contacts 24 on a circuit board 20. This feature is also known as a membrane keypad. On the interior of the dome, a conductive material 26, such as metal, is coated such that when the switch is depressed, the conductive material creates an electrical connection between both of the contacts 24, closing the switch.

Figure 3:
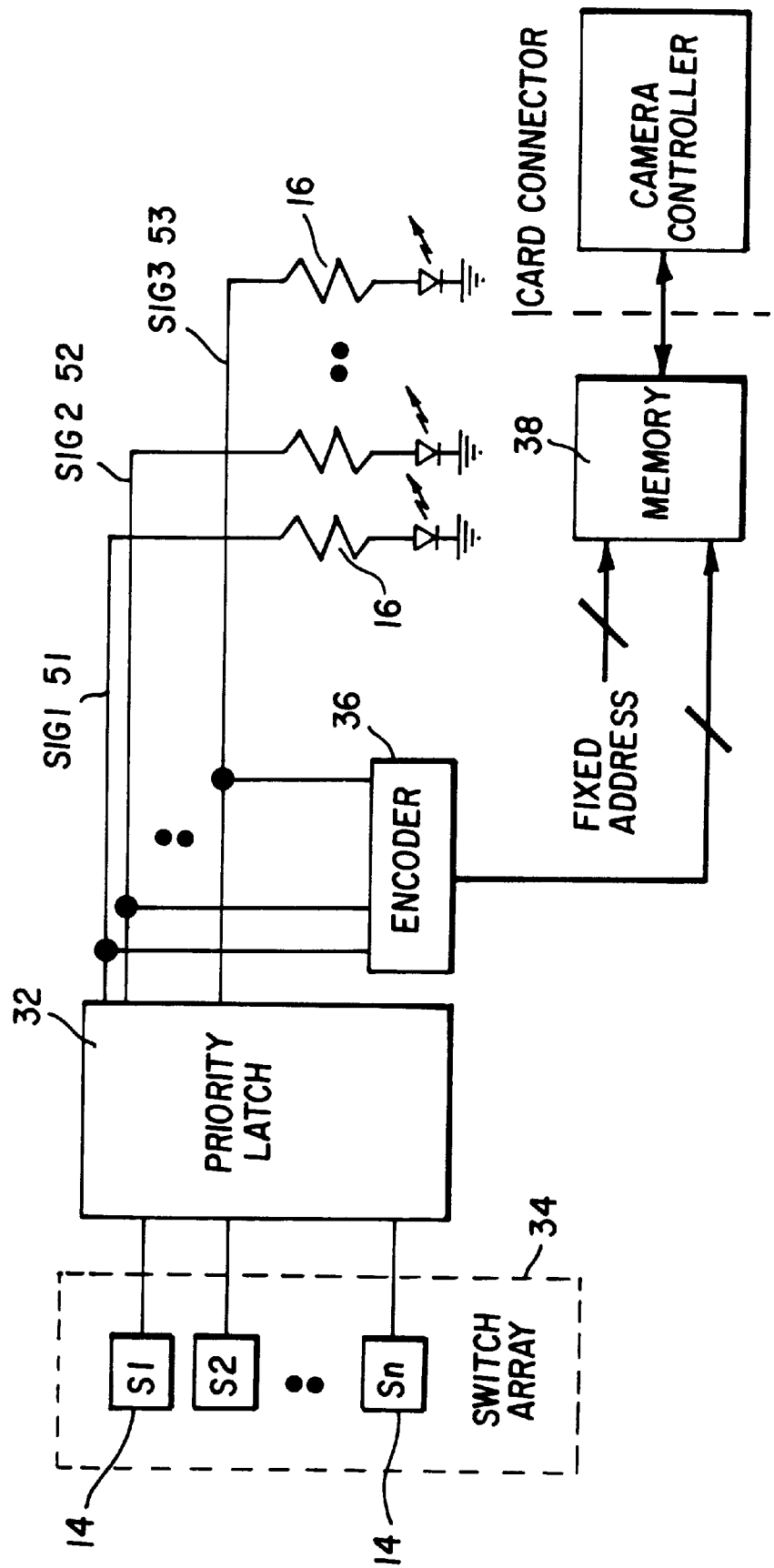
FIG. 3 is a block diagram of a circuit that is envisioned being used with the present invention.

FIG. 3 shows a schematic representation of the preferred embodiment of the circuitry used to implement the decoding of touch contact switches 14 shown in FIG. 1. The signals from the touch contact switches 14 within switch array 34 are decoded by priority latch 32. Priority latch 32 performs the function of resolving simultaneous activation of multiple touch contact switches 14 and to output a high on only one line of either signals: SIG1 51; SIG2 52; and SIG3 53, representing the activation of only one touch contact switch 14. It should be understood that while only three signal lines SIG1 51, SIG2 52 and SIG3 53 are shown that the priority scheme can include any number of bits. The priority latch 32 also drives the indicator LEDs 16, lighting the LED 16 corresponding to the touch contact switch 14 that was pushed. Additionally, the priority latch 32 also drives an encoder 36, which is used to address memory 38 device, which in the preferred embodiment is a programmable non-volatile memory such as an EPROM, $E^2$PROM, fuse link based technology, a PAL, a PLA, a programmable gate array (PGA), or a field programmable gate array (FPGA). If a separate memory is used, as opposed to being integrated with the rest of the circuitry, the addressing scheme consists of the changeable portion from the encoder and a fixed portion representing the local "page" of memory that contains the title code. The output of the memory, which is a code representing a specific title, is read by the camera controller and written to the image storage medium. U.S. Pat. No. 5,130,745 describes a magnetic track writing and recording system and is incorporated by reference. When the film is processed by the photofinisher, the code is read and correlated to annotation data, via a look-up table, and is printed onto the final image.

Figure 4:
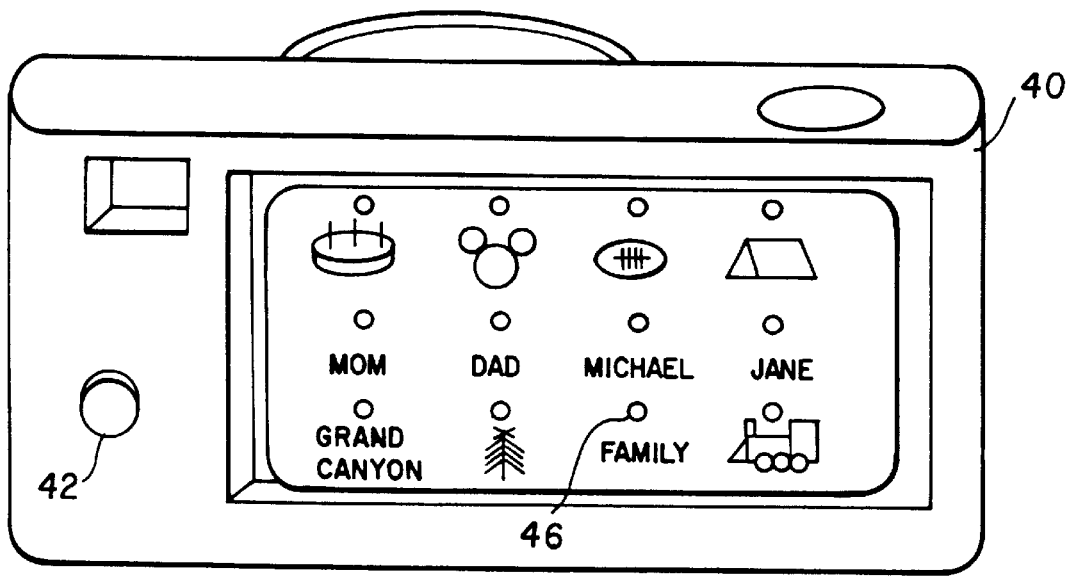
FIG. 4 is an illustration of a second embodiment of the invention having a single switch to select annotation areas on the memory card.
Figure 5:
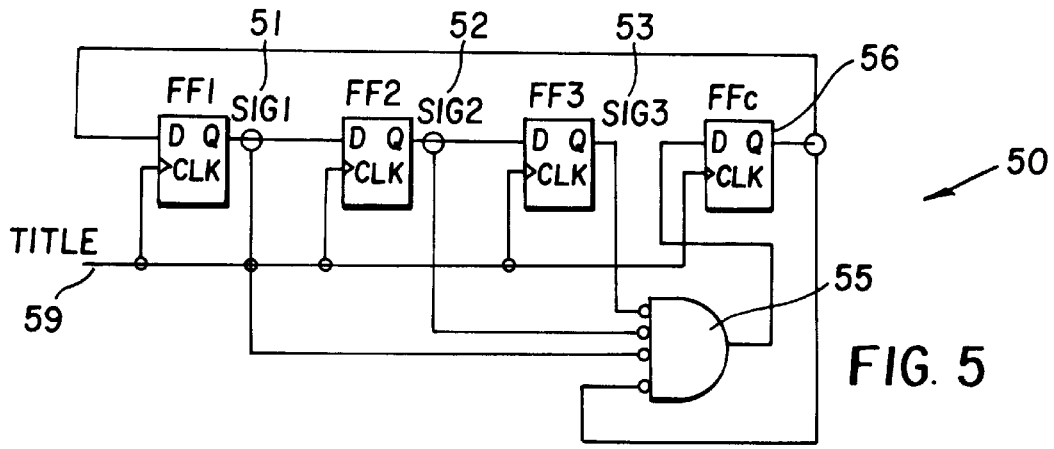
FIG. 5 is a circuit envisioned to be used with the embodiment shown in FIG. 4.

FIG. 4 shows an alternate implementation in which the camera 40 has a single annotation button 42, which is repeatedly pressed to cycle through the various annotation titles. The indicator LEDs 46 will sequence through the selection of annotations shown in the picture display. In this implementation, instead of a keyboard decoder, a ring counter 50 is used which passes a "logic high" signal from the output of one latch to the next, as shown in FIG. 5. Initially, the signal out of DeMorgan equivalent NOR gate 55 is high because all of the outputs of the latches SIG1 51, SIG2 52 and SIG3 53 are low initially. This signal out of NOR gate 55 is then input to carry latch 56, and when low it indicates that no annotation is being selected. Upon activating title 59, clock pulses are sent to each of the latches 51, 52, 53 and 54. This pulse creates a high output to carry latch 56 which is passed serially through the latches 51, 52 and 53 making the output of NOR gate low until all possible selections have been sequentially indicated. When a signal line is activated for a particular latch indicating which of the LEDs 46 are activated. The signals of this particular selection are decoded as described for the previous embodiment.

Figure 6:
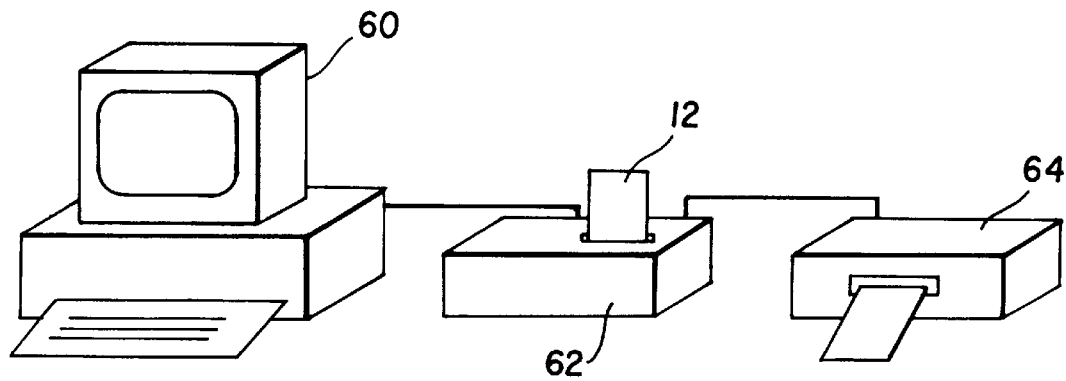
FIG. 6 is a system illustrating a computer connected to a memory card programmer and a printer used to program the memory cards that contain annotation data.

FIG. 6 shows a system where a card 12 containing programmable electronics and switch means is customized for the user by inserting the card into a programming device 62, where the PROM (or other non-volatile memory device) is programmed with the desired titles. The computer 60 also controls a printing device 64, such as an inkjet printer, to print the overlay which is laminated onto the card.

Figure 7:
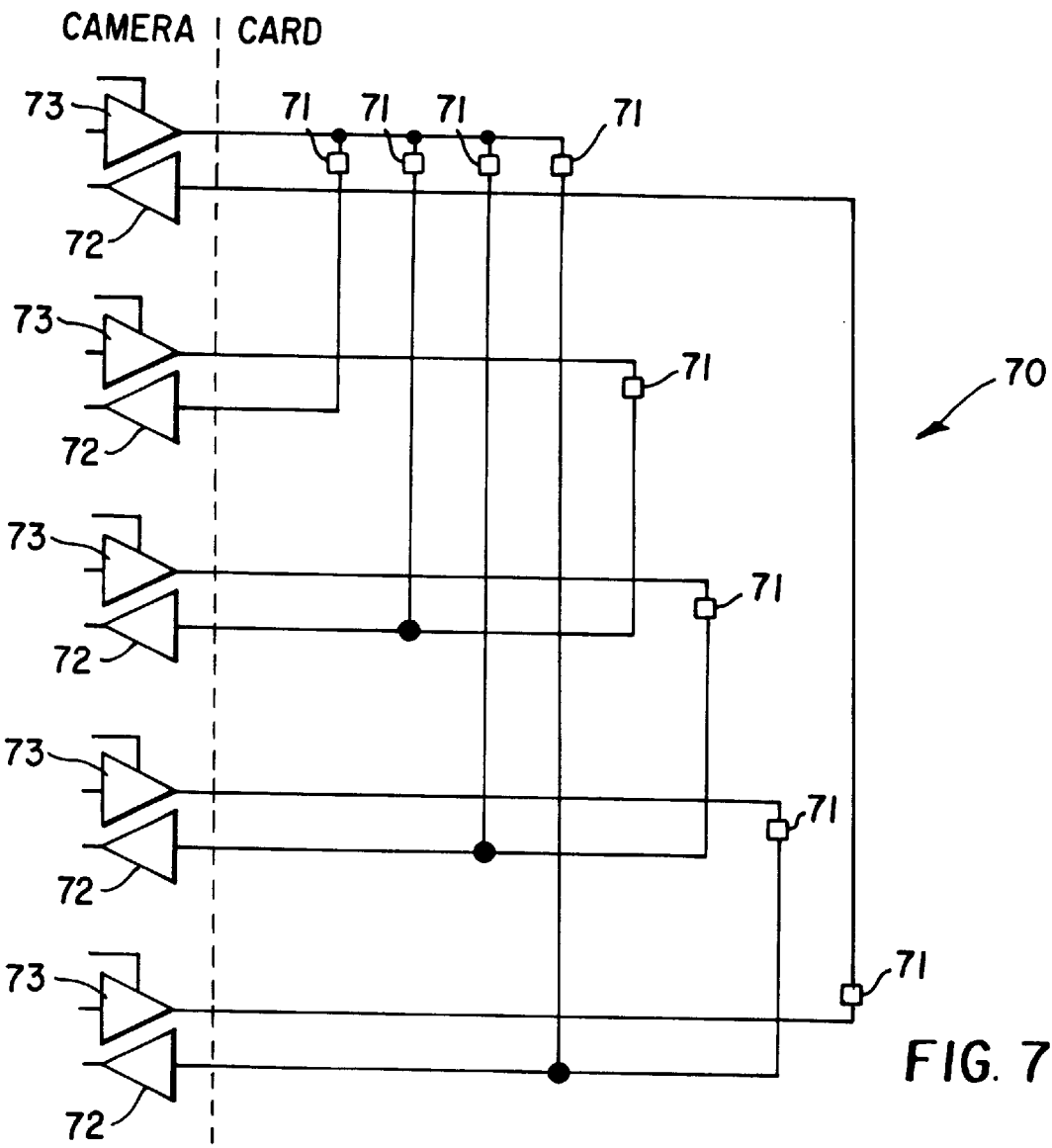
FIG. 7 is a schematic version of conductive paths, as envisioned to be used within the present invention, that allow different paths of the camera memory to be accessed.

FIG. 7 is a schematic diagram illustrating the conductive paths 70 envisioned to be used within the present invention in order to allow different portions of the camera to be accessed.

In this implementation of the invention, the buttons (either a single or a plurality as disclosed earlier), decoder and display LEDs are permanently attached to the camera. The removable portion now only consists of the overlay. The overlay is modified such that it modifies the fixed address portion of the memory control. The modified address would then select a page of the memory. Each button then selects annotation data within that corresponding page. In FIG. 7, the overlay has conductive material imprinted on the back side of the printed overlay. The small squares 71 represent areas that may conduct or not depending on whether a conductive path 70 is printed there. The buffers 72, 73 are activated by the camera microcontroller. The address corresponding to the "fixed" portion of the memory address is read by determining the conductive and nonconductive portions between contact pairs and used by the microcontroller to access the code in memory which is then written to the film storage area. The sequence is set up such that the conductivity between the first buffer and each of the other contacts are checked, then each of the other contacts are checked for connection to the subsequent receiver. In this manner, using a conductive path 70 as a logic high and nonconductive as a logic low, the number of bits encoded is 2(P−1) where P is the number of driver pin pairs. As shown in FIG. 7, for 5 pin pairs, 8 bits are encoded. The printing of the conductive material can be done via a pen plotter or ink jet printer using inks containing conductive particles. In addition, several materials are commercially available that adhere metallic foil to toner particles, the adhesion occurring during the heating portion of the fusing process. The foil stays with the toner areas, and the rest is peeled off of the substrate, in this case, the overlay material. It should be obvious that the printing of the overlay images and the conductive material can occur on two different substrates, with the final step being the lamination of the two substrates. Additionally, this same function can be done optically, with holes in the card transmitting or blocking light or black and white portions of the card that absorb or reflect light.

Figure 8:
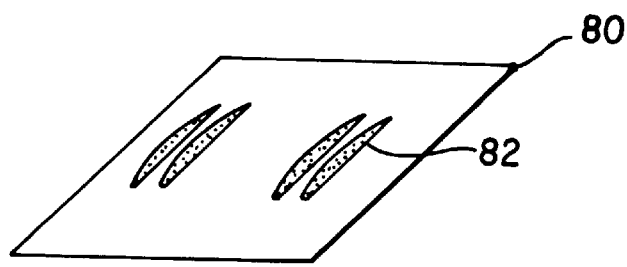
FIG. 8 is a diagram of spring loaded contacts envisioned to used with the present invention.

FIG. 8 shows a configuration where the pin contacts 82 are spring loaded in the camera base 80, and the card is placed over the top with the conductive areas aligned with the contact points to interface with the card.

Parts List

10 a camera
12 removable card
14 touch contact switches
16 indicator LEDs
20 circuit board
22 plastic dome
24 metallized contacts
26 conductive material
32 priority latch
34 switch array
36 encoder
38 memory
40 camera
42 annotation button
46 LEDs 50 counter
51 SIG1
52 SIG2
53 SIG3
55 NOR gate
56 carry latch
59 title
60 computer
62 programming device
64 printing device
80 camera base
82 pin contact

I claim:

1. An annotation system for a camera comprising:

an encoding circuit within the camera;

a memory card having a plurality of activation switches that are electrically coupled to the encoding circuit;

a look up table configured to receive data from the encoding circuit as an input and to generate annotation data for the camera as an output; and means for placing annotation data indicia on film within the camera.

2. The annotation system of claim 1 further comprising switch hit means for giving a visually discernible indication that one of the switches has been activated.

3. The annotation system of claim 1 wherein the switches are membrane switches.

4. The annotation system of claim 1 wherein the lookup table is contained on the memory card.

5. The annotation system of claim 1 wherein the lookup table is contained within the memory card on the camera.

6. The annotation system of claim 1 further comprising a prioritizing circuit to resolve simultaneous switch activation.

7. The annotation circuit of claim 6 further comprising a programmable non-volatile memory wherein the prioritizing circuit is contained within the programmable non-volatile memory.

8. The annotation circuit of claim 7 wherein the programmable non-volatile memory is selected from one of the following circuit elements: (EPROM, E$^2$PROM, fuse link, PAL, PLA, PGA, or FPGA).

9. An annotation system for a camera comprising:

an annotation table contained within a memory device that is electrically coupled to the camera and operatively coupled to at least one activation switch such that the switch will address different portions of the annotation table by consecutive engagements of the activation switch;

visually discernible means to identify which portion of the annotation table has been selected by the activation switch;

an encoding circuit to read selected portions of the annotation table; and means for placing annotation data indicia on film within the camera.

10. The annotation system of claim 9 wherein the encoding circuit further comprises a look up table configured to generate annotation data for the camera.

11. The annotation system of claim 9 wherein the visually discernible means further comprises a plurality of LEDs to indicate which portion of the table is currently selected.

12. The annotation system of claim 9 wherein the annotation table further comprises a plurality of different title selections and the visually discernible means further comprises an LCD display which is operatively connected to annotation table through the switch to display at least one of the different title selections upon activation of the switch.

13. An annotation system for a camera comprising:

an annotation table contained within a memory card containing that is electrically coupled to the camera and operatively coupled to at least one activation switch such that the switch will address different portions of the annotation table within the memory card;

visually discernible means to identify which portion of the annotation table has been selected by the activation switch;

an encoding circuit to read selected portions of the annotation table; and means for placing annotation data indicia on film within the camera.

14. An annotation system for a camera comprising:

an annotation table contained within a memory device that is electrically coupled to the camera and operatively coupled to at least one activation switch such that the switch will address different portions of the annotation table within the memory device;

visually discernible means to identify which portion of the annotation table has been selected by the activation switch;

an encoding circuit to read selected portions of the annotation table; and means for placing annotation data indicia on film within the camera.

15. The annotation system of claim 14 wherein the memory device is addressed via a plurality of conductive paths, the conductive paths that can be altered and allowing different portions of the memory device to be accessed.

* * * * *